S. J. ADAMS.

CORE BOX FOR FORMING CORES FOR CASTINGS.

No. 9,979. Reissued Dec. 20, 1881.

—Witnesses—

R. A. Wunshall

R. C. Smartzneder

—Inventor—

S. Jarvis Adams by James D. Hay

Attorney

N. PETERS, Photo-Lithographer, Washington, D. C.

UNITED STATES PATENT OFFICE.

S. JARVIS ADAMS, OF PITTSBURG, PENNSYLVANIA.

CORE-BOX FOR FORMING CORES FOR CASTINGS.

SPECIFICATION forming part of Reissued Letters Patent No. 9,979, dated December 20, 1881.

Original No. 210,393, dated December 3, 1878. Application for reissue filed November 18, 1881.

DIVISION B.

*To all whom it may concern:*

Be it known that I, S. JARVIS ADAMS, of Pittsburg, in the county of Allegheny and State of Pennsylvania, have invented certain new and useful Improvements in Core-Boxes for Forming Cores for Castings; and I do hereby declare that the following is a full, clear, and exact description thereof, reference being had to the accompanying drawings, which form a part of this specification.

Figure 1:
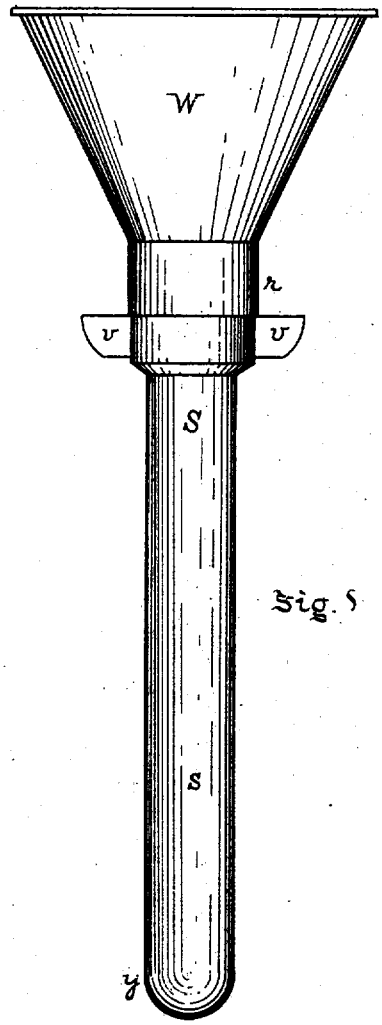
Figure 2:
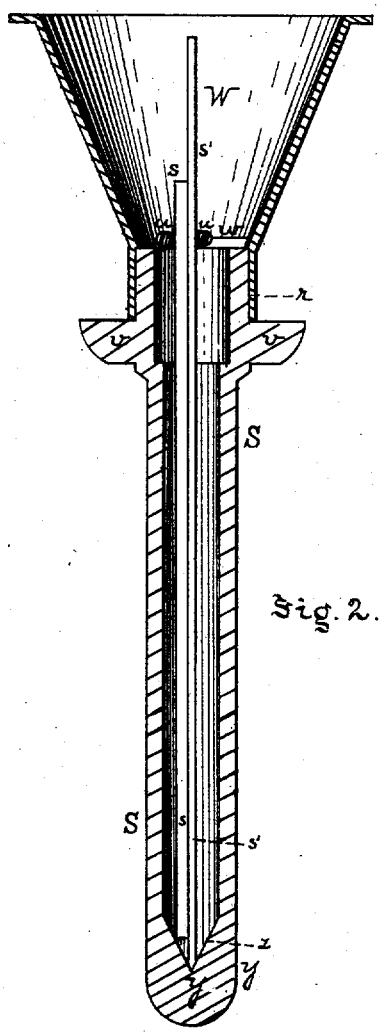

Figure 1 is a side view of my improved core-box, and Fig. 2 is a longitudinal vertical section of the same.

Like letters of reference indicate like parts in each.

My invention relates to the core-boxes used in forming cores for long hollow molds; and its object is to form core-boxes suitable for the molding of these cores by jarring the sand to place as contradistinguished from ramming them by means of ramming-tools. In forming these cores it is necessary to have a rod passing through the core to give the requisite support, and also in molding to form a vent-hole, by means of a wire passing through the core, for the escape of the gas in casting. The space around this supporting-rod and vent-wire is so small that it is almost impossible to form a hard evenly-rammed core, as the ramming-tools could not be properly used, and the sand was fed gradually into the core and rammed as fed, and some parts of the core were consequently soft and spongy, while other parts were rammed hard and would stick to the core-box, rendering it hard to remove the core. As the sand was not evenly packed the molten metal was liable to press into the spongy parts, and would scab or blow at the hard spots of the core, as metal will not lie evenly against a hard body of sand, thus forming imperfect castings.

The other division of this application for a reissue describes and claims a method of forming molds and cores, without the use of ramming-tools, by imparting to the flask or core-box, having a reservoir for the surplus sand, a jar, and thereby packing the sand uniformly around the pattern or within the core-box.

The object of this invention is to provide a core-box for molding cores by jarring, which can be used without a jarring-table or like apparatus for lifting it and imparting the jar to it.

It consists, first, in a core box for molding cores by jarring, having a solid base formed with the core-box for receiving the jar in molding, so that the workman may mold the core by simply raising the core-box and permitting it to drop on a stationary block or table, thus jarring the sand to place; and, second, in means for centering the supporting-rod in the core-box.

To enable others skilled in the art to make and use my invention, I will describe its construction and manner of use.

S represents my improved core-box, the one shown being for the formation of cores for wagon-boxes. This core-box is preferably made of cast-metal, and has a cylindrical cavity corresponding in shape to the core to be formed. The core-box is provided with a closed or solid base, *y*, sufficiently strong to take the jar in molding the core, the closed base being cast integral with the body of the core-box. In the base *y* is formed the recess or seat *z*, for holding the lower end of the supporting or strengthening rod *s* or vent-wire *s'* in the center of the core. Above the core-box S is the sand-reservoir W, made of sheet-iron or other suitable material, and provided with an annular recess, *r*, in which the mouth of the core-box fits. Across, or partially across, the base of the reservoir is the bar *w*, provided with the ring *u* in the center, to hold the upper ends of the strengthening-rod and vent-wire in the center of the core box.

In forming cores in my improved core-box the strengthening-rod *s* and vent-wire *s'* are placed in the core-box, and center themselves in the recess *z* at the base thereof, and the reservoir W is placed on the core-box, the rod *s* and wire *s'* fitting within the ring *u*, as above described, thus centering the rod and wire. Sand is then fed into the reservoir and jarred through the reservoir into the core-box, the core-box and reservoir attached thereto being lifted by the operator and permitted to drop on the stationary table or block, to impart the jar to the sand, and the solid base *y* of the core-box taking the blow when it is dropped. The sand in the reservoir feeds through to the core-box below, and the surplus sand in the reservoir serves as a weight to compact the sand in the upper part of the core-box, thus forming a solid core throughout. The jarring is continued as above described until the sand is sufficiently packed, which will be known to the skilled workman by the number and force of the jars, and the reservoir is then turned, thus causing the rod *w* to cut off the surplus sand from the top of the core. The reservoir is then lifted off, the vent-wire drawn out, the box inverted, and the core removed from the core-box by a slight jar on the lug *v*, after which it is properly dried. It is not necessary to use the reservoir W, as the upper end of the wires may be held and the sand fed by hand.

By my improved core-box evenly-packed cores may be rapidly and easily formed by the jarring process without the employment of any machinery for supporting the core-box or imparting the jar to it, as the closed base takes all the jar and enables the work to be done by hand, which is of great importance in forming small cores.

No claim is made herein to the process or apparatus shown and described in the other division of this application other than that employed in forming cores, as particularly shown and claimed herein.

What I claim as my invention, and desire to secure by Letters Patent, is—

1. A core-box for molding cores by jarring, provided with a solid base formed with the core-box to receive the jar during the formation of the core, substantially as set forth.

2. A core-box for molding cores by jarring, provided with a solid base formed with the core-box to receive the jar and a seat in the solid base to center the strengthening rod, substantially as set forth.

3. In combination with the core-box S and reservoir W, the wire *w*, for cutting the sand between the flask and reservoir, substantially as set forth.

In testimony that I claim the foregoing I have hereunto set my hand this 15th day of November, 1881.

S. JARVIS ADAMS.

Witnesses:
F. G. KAY,
JAMES I. KAY.